United States Patent [19]

Akkerman et al.

[11] 4,135,547

[45] Jan. 23, 1979

[54] QUICK DISENGAGING VALVE ACTUATOR

[75] Inventors: Neil H. Akkerman; Stephen R. Foster, both of New Orleans, La.

[73] Assignee: Baker International Corporation, Orange, Calif.

[21] Appl. No.: 801,507

[22] Filed: May 31, 1977

Related U.S. Application Data

[63] Continuation-in-part of Ser. No. 777,373.

[51] Int. Cl. .................... F16k 43/00; F16k 31/124
[52] U.S. Cl. ...................... 137/315; 60/413; 91/417 A; 92/134; 251/63.5
[58] Field of Search .............. 60/413, 418; 91/417 R, 91/417 A; 92/134; 251/31, 62, 63, 63.4, 63.5, 84; 137/315

[56] References Cited

U.S. PATENT DOCUMENTS

| 228,210 | 6/1880 | Meier | 251/84 |
|---|---|---|---|
| 301,761 | 7/1884 | Senna | 251/84 |
| 2,099,368 | 11/1937 | Levy | 92/134 |
| 3,248,879 | 5/1966 | Natho | 92/134 |
| 3,290,003 | 12/1966 | Kessler | 137/315 |
| 3,434,393 | 3/1969 | Cairatti | 91/417 A |
| 3,570,244 | 3/1971 | Strobel et al. | 92/134 |
| 4,036,106 | 7/1977 | Athy, Jr. | 60/413 |

Primary Examiner—Martin P. Schwadron
Assistant Examiner—G. L. Walton
Attorney, Agent, or Firm—William C. Norvell, Jr.

[57] ABSTRACT

An actuator is provided which is respondable to control fluid pressure for moving an operative means of a valve between open and closed positions. The actuator comprises a housing defining a cylindrical bore therewithin. In one form, a shaft is carried in the housing and is engagable with the operative means. Means define first and second effective piston areas and are carried by one of the shaft and the housing and are sealingly slidable along the other of the shaft and the housing, being longitudinally movable within the cylindrical bore. The apparatus has first and second fluid chambers companionly associated with the means defining the first and second effective piston areas within the bore for yielding a differential force across the means defining the first and second effective piston areas upon increase of fluid control pressure within the actuator. A continuously chargeable fluid accumulator means is in fluid communication with the second fluid chamber for storage of energy defined by fluid, preferably control fluid, compressible therein. Fluid passage means for transmitting fluid under pressure is provided to said first fluid chamber and to said accumulator means. Valve means ae movable between open and closed positions and communicate between the accumulator means and the fluid passage means to permit fluid control pressure changing of the accumulator chamber when the valve is in the open position and for preventing discharge of fluid pressure within the accumulator chamber when the valve is in the closed position. The valve is responsive to pressure differential between the accumulator chamber and the fluid passage means. The shaft is selectively shiftable longitudinally in a first direction to move the operative means to one of open and closed position by variation in fluid control pressure, and is shiftable to a second direction to move the operative means to the other of the open and closed positions upon subsequent variation in fluid control pressure. One of the shaft and operative means has slotted means thereon for transverse receipt of a companion engagement means on the other of the shaft and the operative means whereby the operative means and the shaft are thereafter in substantial longitudinal engagement point. The shaft and the operative means are disengageable by relative transverse shifting of the shaft and the operative means to remove the actuator from the valve.

28 Claims, 6 Drawing Figures

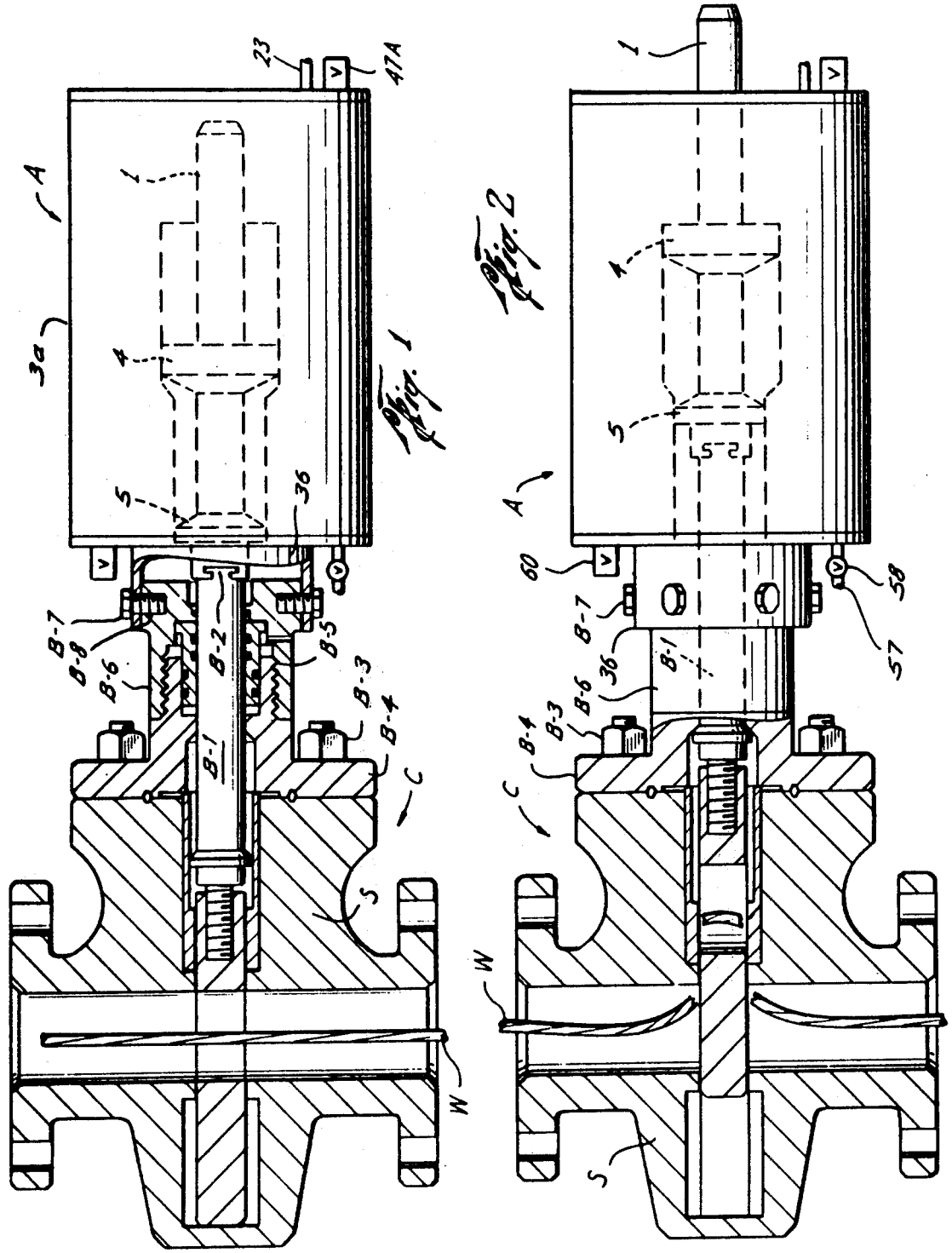

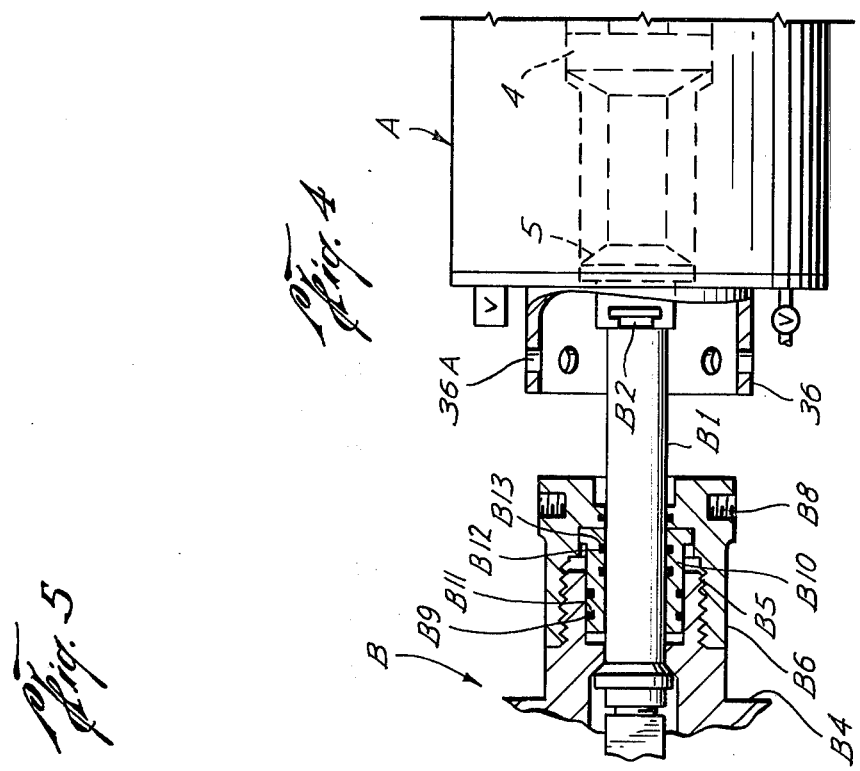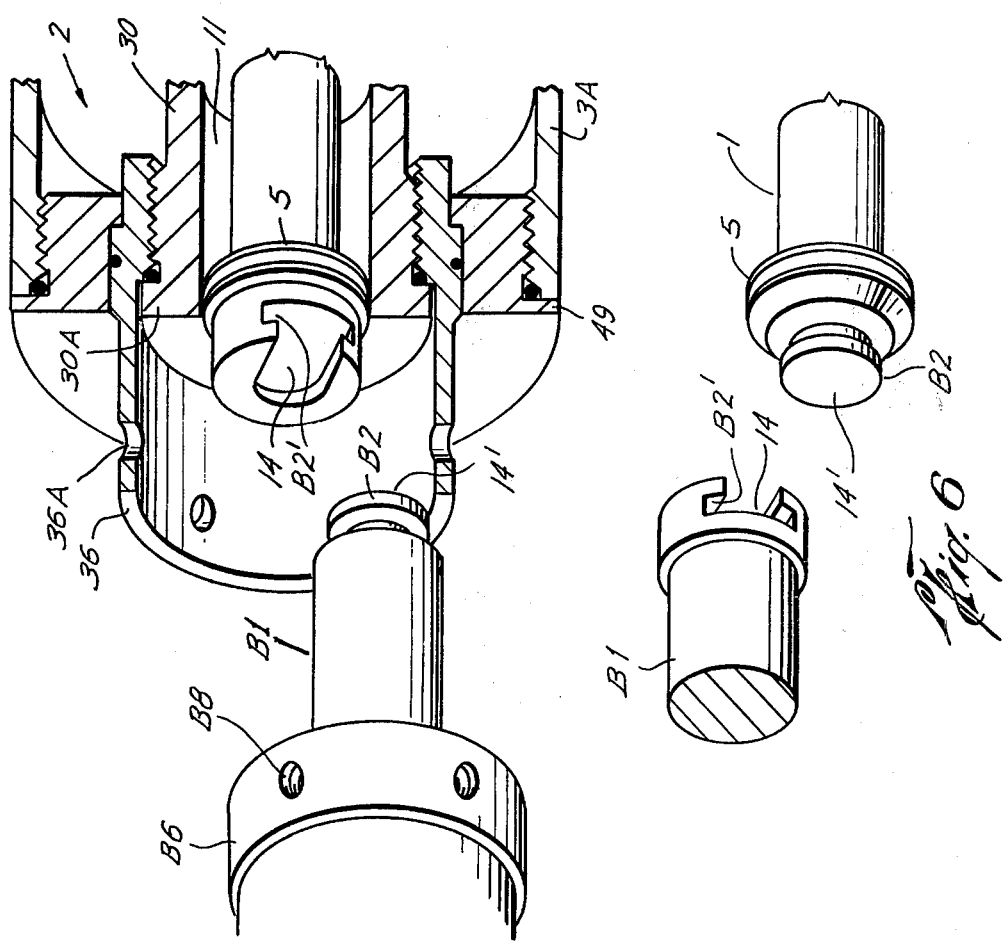

QUICK DISENGAGING VALVE ACTUATOR

CROSS REFERENCE TO RELATED APPLICATIONS

The present application is a continuation-in-part application of copending application Ser. No. 777,373, entitled "Valve Actuator Having A Continuously Charged Accumulator", filed on Mar. 14, 1977.

BACKGROUND OF THE INVENTION

1. Field of the Invention

The present invention relates to a fluid operable valve actuator having means thereon for quickly disengaging the actuator from the valve body.

2. Description of the Prior Art

Actuators are utilized to manipulate a valve mechanism within a flow line into open and/or closed position in response to control pressure variation. Normally, these actuators comprise a shaft and a fluid activated mechanism in association therewith which, upon activation thereof by increase in control line pressure, causes longitudinal movement of the shaft to shift the valve in relation to its seat. Venting of control line pressure will cause a subsequent and second longitudinal shifting of the shaft and the valve head to a second position. Such valve systems are frequently utilized in safety systems used in conjunction with the drilling, completion and production of offshore, as well as inland, oil and gas wells. Additionally, such components are utilized in natural gas transmission lines, and the like.

During the completion, testing and/or workover of a subterranean well, it may be necessary to run equipment such as a perforating gun, or the like, on a wire or other line into the well when the well is under pressure. This is achieved by inserting the equipment into a length of production tubing above the christmas tree, the length of tubing being commonly referred to as a "lubricator". The lubricator is isolated from the portion of the well therebelow by a valve or a series of readily accessible hand manipulated valves. In view of the fact that the lubricator assembly must contain the well pressure while the equipment is inserted therethrough for subsequent utilization in the well, it is necessary to control the well pressure below the lubricator assembly during this procedure. To contain the well, in the event of failure of the components of the lubricator, a safety valve mechanism is positioned below the lubricator. This valve should be "fail safe" and should be activatable remotely or automatically upon loss of control.

When a gate valve mechanism is utilized below the lubricator, the valve actuator should be of such design and construction that, upon longitudinal shifting of the stem therein, the gate is permitted to completely close with sufficient force such that a wire line carrying downhole tools may be sheared by the gate upon longitudinal shifting of the shaft within the actuator. Upon detection of pressure leaks within the lubricator, or when control of the well is lost and it begins to prematurely flow, the actuator should have sufficient force to cause the wire line to be sheared when the gate is closed in order to assume that the gate is sealingly interfaced onto its seat to prevent flow therethrough. The force which shears the wire line penetrating through the gate opening should be independent of the well pressure within the valve body.

Normally, valve actuators depend upon pressure within the valve body operably associated with a compressed spring assembly to shift the bonnet stem longitudinally in order to permit the valve to close. The spring assembly within the actuator is present only for minor friction forces, and fail safe gate valve actuators heretofore made commercially available do not have sufficient force to shear a wire line during the valve closing sequence, in the absence of well pressure in the valve body.

Standard fail safe gate valve actuators are not afforded sufficient force to shear wire inserted through the valve due to physical and technological limitations and sizing requirements for the valves and their associated operating components. A double acting actuator with pressure operable upon either side of a piston element could be utilized in conjunction with spring force to cause manipulation of a shaft within the actuator to, in turn, cause sufficient force to be exerted on the shaft such that longitudinal movement of the shaft shears the wire line inserted through the valve body. It should be noted that this double acting actuator design is not fail safe, because loss of control pressure will not assure closing of the valve head onto its seat. This piston arrangement would require an external charging force, such as a nitrogen accumulator. Consequently, a stock of nitrogen bottles would be required at the well or other commercial site. The nitrogen charged accumulator would force control fluid out of one of the piston chambers, whereby the valve head is shifted to the closed position. Thus, it is clear that longitudinal movement of the stem when control pressure is vented off to close the valve would require two control lines, the first line being in association with a supply port and one piston chamber, and a second control line in a second or boost port communicating with a second or boost piston chamber. In view of the fact that the actuator design must be "fail safe", that is, it must assure closure of the valve when control line pressure is intentionally or unintentionally bled off, the incorporation of two control lines into the design of the actuator renders the design doubly susceptible to failure by leaks and/or breaks in the lines.

As an alternative design, a concentric accumulator exteriorly surrounding the actuator could be utilized as an integral part of the actuator. This design would require the utilization of nitrogen bottles in a bank for continuous charging of the accumulator. Additionally, the two control lines would, of necessity, still be required to maintain nitrogen charges. Use of plural lines would, in turn, continue to double expose the apparatus to the likelihood of nitrogen leaks which are extremely difficult to detect and seal.

In the past, when it has been found necessary to repair the valve mechanism or the actuator itself on location, considerable down time has been required during the dismanteling of the actuator from the valve bonnet stem in order to have access to the valve or actuator components. The down time has necessitated shut in of a flowing well or isolation of the valve mechanism from the flow stream of a transmission line, which, in turn, has an adverse economic impact because of the cost of lost rig time, lost production, and the like. Moreover, many prior art actuators are designed such that in the event of onsite failure of the attached valve mechanism or the actuator, the actuator must be almost completely disassembled in order to remove or replace the actuator or repair the valve. For example, the prior art has taught use of an actuator valve assembly wherein the actuator is affixed onto the valve body by means of bolts inserted through the lower housing and into companion bores in the upper face of the valve housing. Also, the prior art typically provides for connection of the actuator shaft to the valve head by means of a shoulder on the actuator shaft insertible within a companion slot in the valve head, all within the valve body, the actuator shaft and bonnet stem being one continuous piece. Variations of prior art actuators include those generally as above described and including an actuator expander which functions to adaptably mount an actuator onto the valve body. The present invention overcomes this deficiency by providing means for quickly engaging and disengaging the actuator with respect to the valve body and within the approximate total length of the actuator.

The present invention overcomes many of the disadvantages found in prior art commercially available actuators by providing an actuator having an internal cylindrical accumulator with sufficient volume such that the fluid therein may be compressed with sufficient force to assure that the shaft is longitudinally shifted to shear a wire line inserted through the valve body during the valve closing sequence. The accumulator requires no incremental or continuous charging with secondary sources, such as nitrogen; hence, problems associated with secondary source leakage are eliminated. Additionally, in the preferred form, the present invention necessitates usage of only one control line, this advantageous feature being attributable to usage of a check valve within a conduit or passageway extending between the control line and the accumulator chamber and being within the actuator itself. Moreover, the check valve mechanism permits continuous charging of the accumulator chamber so that when supply pressure is vented off, pressure within the accumulator chamber is trapped and compressed fluid therein will drive the piston and its associated shaft in a longitudinal direction to shift the gate or other valve member, for example, to isolate the fluid flow within the valve body. In the present invention, in the event of leakage of O-rings or other sealing elements, the accumulator chamber will continue to be charged with fluid through the control line which will result in a "fail safe" actuator which does not require usage of secondary fluid sources, such as nitrogen bottles or nitrogen caps on the accumulator to drive the fluid under the piston and upwardly to shift the valve.

The present actuator has a physical design advantage in that it can be manufactured substantially shorter lengthwise than actuators designed to operate within and at similar pressure environments, but responsive to compressibility of spring elements. Although the diameter of the present actuator is somewhat larger than comparative-sized actuators operative at the same control pressure, the present invention now contains approximately ten times the closing force of spring-fed actuators. For example, a 5,000 pound closing force can be obtained using the continuously fed accumulator chamber of the present actuator. To obtain such a closing force in a spring-fed prior art actuator, ten concentricly mounted 500 pound force springs would have to be utilized. This, in turn, would require an actuator having a housing approximately two times the diameter of the housing of the actuator of the present invention. Additionally, such a spring-fed actuator would be considerably longer (lengthwise) than the present actuator due to space requirements for the action of the spring. Moreover, the absence of a spring element in the present actuator renders it less susceptible to mechanical failure because the risk of spring failure or breakage due to corrosion and/or metal fatigue is eliminated.

The present actuator utilizes a plurality of pressure chamber areas which permits continuous charging of the accumulator because of the variance in the areas of each of the chambers, whereby forces applied through the chambers are selectively pressurable. Thus, by having independent control of each of the chamber areas, fluid media, control pressure, and operating forces can be independently controlled. This design will result in reduced loads being applied to the bonnet stem.

Another advantage of the present actuator is that the shearing of wire line inserted through the valve is not a function of well pressure through the valve body itself, and there is sufficient pressure acting upon the piston and shaft elements to sufficiently shear a wire line extending through the valve, thus permitting a complete fluid seal between the valve head and its seat, upon closing of the valve.

SUMMARY OF THE INVENTION

The present invention comprises an actuator which is respondable, preferably, to control fluid pressure for moving an operative means of a valve between open and closed positions. The actuator has a housing which defines a cylindrical bore therethrough. A shaft is carried within the housing and is engagable with the operative means, in a preferred form. Means defining first and second effective piston areas are carried by one of the shaft and the housing and are sealingly slidable along the other of the shaft and the housing and longitudinally movable within the cylindrical bore. The apparatus provides first and second fluid chambers which are companionly associated with the means defining first and second effective piston areas within the bore for yielding a differential force across the means defining the first and second effective piston areas upon variation of fluid control pressure within the actuator. The apparatus has a continuously chargeable fluid accumulator means in fluid communication with said second fluid chamber for the storage of energy defined preferably by control fluid which is compressible therein. A fluid passage means for transmitting fluid under pressure is provided to said first fluid chamber and to the accumulator means. A valve means is movable between open and closed positions and communicates between the accumulator means and the fluid passage means to permit fluid control pressure charging of the accumulator chamber when in said position and preventing discharge of fluid pressure within the accumulator chamber when the valve is in the closed position, the valve being responsive to pressure differential between the accumulator chamber and the fluid passage means, the shaft being selectively shiftable longitudinally in a first direction to move the operative means to one of open and closed positions, preferably, by increase in fluid control pressure, the shaft being selectively shiftble longitudinally in a second direction to move the operative means to the other of open and closed positions, preferably, upon subsequent decrease in fluid control pressure and release of energy stored within the accumulator.

The present invention also provides, independently of the utilization of plural piston means and/or the fluid accumulator, means for readily and quickly engaging and disengaging the actuator with respect to the valve body without the requirement of disassembly of the actuator. Moreover, the engagement means are operative to assure that the valve head is in closed position with respect to its seat during removal of the actuator from the valve body. The engagement means also permit affixation onto and removal of the valve body of the actuator within the approximate total length of the actuator such that the actuator is very easily affixed to or removed from valve mechanisms in close proximity to well heads and the like.

The apparatus of the present invention is utilized in a preferred form with a continuously chargeable fluid accumulator means in fluid communication with a second fluid chamber for the storage of energy defined preferably by control fluid which is compressible therein.

BRIEF DESCRIPTION OF THE DRAWINGS

FIG. 1 is a longitudinal schematic and sectional view of the actuator of the present invention incorporated onto an operative means, or bonnet assembly, of a gate valve which, in turn, forms a part of a lubricator assembly, with a wire line being inserted through the gate valve, the gate of the valve being shown in open position.

FIG. 2 is a view similar to that shown in FIG. 1, with the gate of the valve being shown in closed position and the wire line completely sheared.

FIG. 4 is a partial longitudinal sectional drawing of the actuator in position during removal from the valve body, with its bolts securing the actuator housing to the valve body being removed to permit the housing to be pumped up to permit relative transverse shifting of the shaft and the bonnet to completely disengage the actuator from the valve body.

FIG. 5 is a detailed view of the shaft and bonnet in completely disengaged position.

FIG. 6 is a view of an alternative design illustrating the slotted means on the valve bonnet and the companion engagement ring on the shaft of the actuator.

DESCRIPTION OF THE PREFERRED EMBODIMENTS

Figure 3:
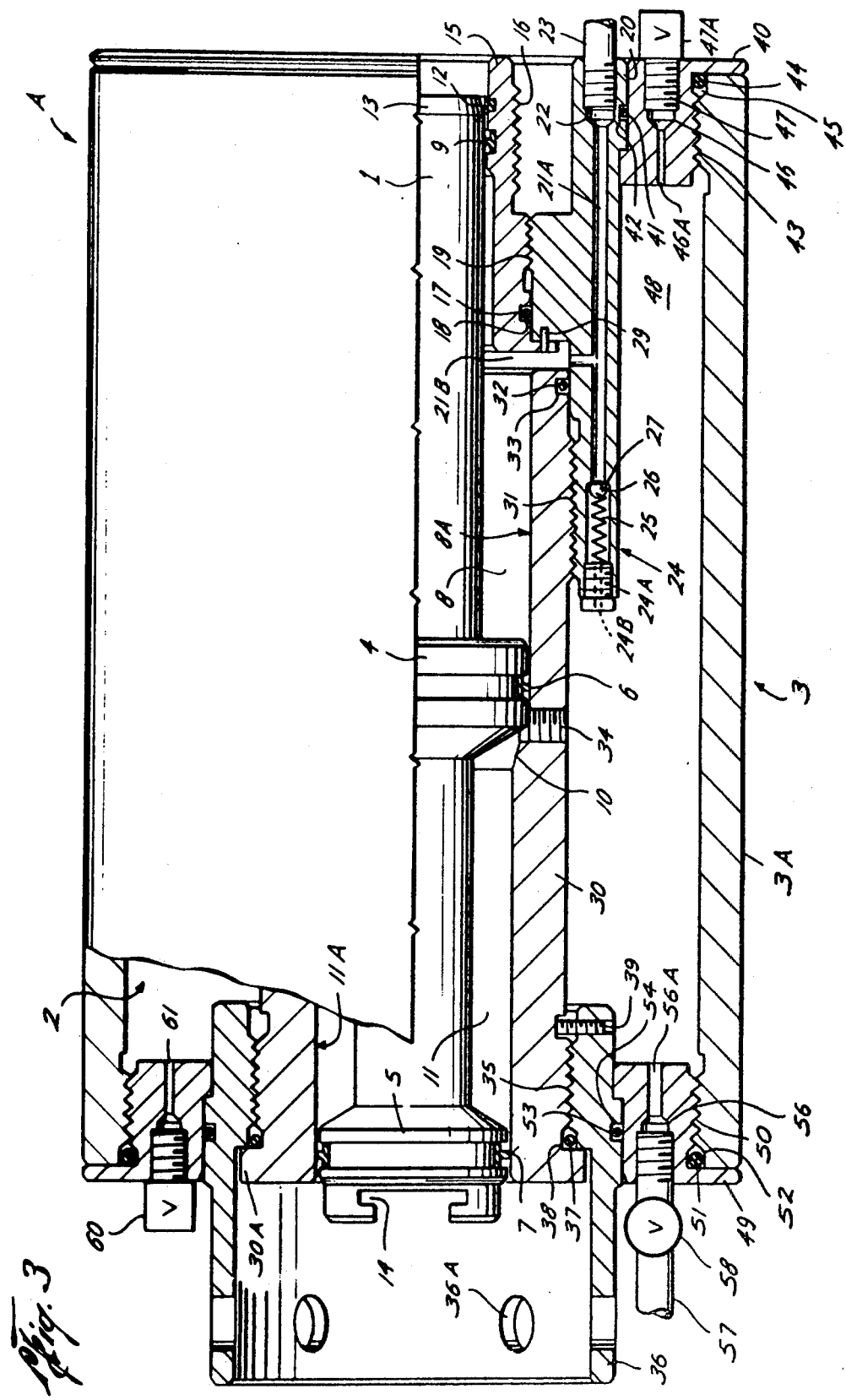
FIG. 3 is a longitudinal sectional drawing of the actuator shown in FIGS. 1 and 2, the position of the respective components of the actuator being as is illustrated in FIG. 1.

The actuator A basically is comprised of a shaft 1, an inner housing 2 longitudinally extending exteriorly of the shaft 1, and an accumulator housing 3 defined exteriorly from the inner housing 2. In FIGS. 1 and 2, the actuator A is shown in engagement onto a valve body C by means of a bonnet assembly B.

The shaft 1 is a longitudinally extending elongated member having exteriorly and circumferentially mounted thereon upper and lower piston head members 4 and 5. The upper piston head 4 has defined thereon an elastomeric exteriorly protruding T-seal element 6 which slides longitudinally along a smooth wall 8A of the inner cylinder 30 when the shaft 1 is manipulated. The seal element 6 provides a dynamic seal between the piston head 4 and the inner cylinder 30 and defines the lower end of an upper piston chamber 8. An interiorly protruding beveled shoulder 10 on the inner cylinder 30 defines the down stop for downwad travel of the upper piston head 4.

The lower piston head 5 carries exteriorly thereon a T-seal element 7 of substantially the same construction as T-seal 6, the T-seal 7 being permitted to travel longitudinally along the smooth wall 11A of the inner cylinder 30 and forming a dynamic seal therebetween and thereby defining the lower end of the lower piston chamber 11.

The upper piston head 4 is the lower end of an upper piston chamber 8 interiorly defined within the inner cylinder 30 by means of the smooth wall 8A. The upper piston chamber 8 is terminated by means of dynamic T-seal 9 carried within and protruding outwardly from a shaft guide 15, the T-seal 9 preventing fluid communication between the shaft 1 and the shaft guide 15 while the shaft 1 is longitudinally stabilized as well as when the shaft 1 is shifted to open or close the gate valve described below.

The lower piston head 5 defines the lower end of a second or lower piston chamber 11 defined thereabove and extending interiorly of the inner cylinder 30 along the smooth wall 11A thereof. T-seals 6 and 7 define the upper and lowermost ends, respectively, of the lower chamber 11, while T-seals 9 and 6 define the upper and lower ends, respectively, of the upper piston chamber 8.

Immediate the top end 13 of the shaft 1 is a plastic wiper seal 12 which wipes contaminants off the shaft 1 as the shaft 1 is longitudinally manipulated within the inner housing 2 and the T-seal 9. A "T" shaped slot 14 is defined at the lowermost end of the shaft 1 for receipt of a companion bonnet step B-1 in the bonnet assembly B.

The inner housing 2 of the actuator A is comprised of a longitudinally extending shaft guie 15, an inner cylinder member 30 immediately therebelow, an upper cap 20 immediate and affixed to shaft guide 15, and a bonnet attachment 36 defined exteriorly around the lowermost portion of the inner cylinder 30. The shaft guide 15 is elongatedly defined around the exterior of the shaft 1 and has thread members 16 for affixation onto the actuator A of accessory components, such as heat-sensitive lock open elements, and the like. Additionally, the threads 16 serve to receive a protector element (not shown) which is threadedly secured thereon to position the shaft 1 within the actuator A during shipment and on-site assembly to the bonnet and valve, the protector and its companion washer being rotatably removable by hand from the threads 16 and the actuator A prior to initial operation of the actuator A. The shaft guide 15 also houses the wiper ring 12 and the T-seal 9, and is secured by threads 19 to the cap member 20 exteriorly thereof, an O-ring 17 circumferentially extending around the shaft guide 15 within its companion bore 18 preventing fluid communication between the shaft guide 15 and the cap 20.

In order to assure elimination of the relative rotational movement between the members 15 and 20, a pin 29 is longitudinally extended therebetween. The cap member 20 has at its upper end a supply port 22 for receipt of a control line 23 sealingly engagable therewithin and in communication with a control panel (not shown) containing supply of fluid under pressure. The supply port 22 is immediately communicable at all times with a longitudinally extending passageway 21A defined within the cap 20, the passageway 21A terminating at its lower end at a check valve 24, the passageway 21A being intersected at a point defined as the beginning of a latitudinal passageway 21B extending laterally of the passageway 21A within the cap 20 for fluid communication between the upper piston chamber 8 and the passageway 21A.

The check valve 24 comprises a lower plug element 24A threadedly securable within the cap 20 and having therein a longitudinally extending passageway 24B, the plug element 24A providing on its upper end a seat for the receipt of the lower end of a compressible spring element 25. The spring element 25 normally urges a companion spherical ball element 26 at the top thereof onto its seat 27 at the lower end of the passageway 21A. However, fluid under pressure within the passageway 21A is permitted to travel exteriorly around the ball 26 within the check valve 24 and thence through the passageway 24B when the ball 26 is urged off its seat 27 at such time as the compressive force contained within the spring 25 is overcome by the higher control fluid pressure transmitted within the passageway 21A.

Extending below the shaft guide 15 and secured to the lower portion of the cap member 20 by means of threads 31 is the inner cylinder 30 which has a circumferentially extending elastomeric seal element 32 defined within its bore 33 for prevention of fluid communication between the cylinder 30 and the cap 20. The upper portion of the inner cylinder 30 has a smooth interior wall 8A which defines a travelway for the T-seal 6 carried on the piston head 4 upon longitudinal shifting of the shaft 1, as described below. Additionally, the inner cylinder 30 comprises the beveled shoulder 10 for definition of the down stop for the piston head 4 and the shaft 1. The inner cylinder 30 has, immediately below the shoulder 10, a latitudinally defined boost port 34 to permit continuous fluid transmission and communication between the lower or boost chamber 11 below the lower or piston head 4 and the accumulator chamber 48. The inner cylinder 30 also has a smooth wall 11A which is a companion wall to smooth wall 8A for travel thereon of the T-seal 7 carried on the lower boost piston head 5 when the shaft 1 is longitudinally manipulated. The inner cyliner 30 also contains at its lowermost end a longitudinally extending outwardly protruding shoulder member 30A which, when the inner cylinder 30 is affixed to the bonnet attachment 36 therebelow by means of threads 35, serves to carry load thereon and through the inner housing 2. A set screw 39 serves to further secure the bonnet attacment 36 to the inner cylinder 30 during on-site assembly of the actuator A with the bonnet and valve members.

The bonnet attachment 36 is a cylindrical member having defined therethrough a series of circular bores 36A for receipt of threaded bolt members B7 of the bonnet assembly B when the actuator A is affixed to the bonnet B.

The accumulator housing 3 is comprised of an elongated cylindrical body 3A which is affixed at its upper and lower ends by upper and lower plates 40 and 49, respectively. The upper plate 40 is affixed to the body 3A by means of threads 43, with a circumferentially extending O-ring 41 within its bore 42 on the cap 20 preventing fluid communication between the cap 20 and the upper plate 40, while O-ring 44 defined within a circumferentially extending bore 45 prevents fluid communication between the upper plate 40 and the body 3A. The upper plate 40 has defined there-in a port 46 at the upper end of a longitudinally extending passageway 46A. The port 46 receives a valve 47 which is in normally closed position. The valve 47 is manipulated to open position subsequent to operation of the actuator A in the event and at such time that it is desired to permanently or temporarily remove the actuator A from the bonnet B in order to relieve residual pressure within the chamber 48 and remove residual fluid therefrom.

The lower plate 49 is a companion plate to the upper plate 40 and is secured to the body 3A by means of threads 50. An O-ring element 53 circumferentially carried within a bore 54 defined on the bonnet attachment 36 prevents fluid communication between the bonnet attachment 36 and the lower plate 49, while a companion elastomeric O-ring element 51 within its bore 52 prevents fluid communication between the lower plate 49 and the body 3A.

A passageway 56A longitudinally extending through the lower plate 49 terminates within an area defining a port 56 within the lower plate 49 and receives a check valve 58 on a fluid line 57 which may be in fluid communication with a pressurized fluid source utilized as a second or back-up means for continuously or incrementally charging the accumulator housing 3, with the valve 58 in closed position assuring "fail safe" operation of the apparatus A. Additionally, the line 57 and valve 58 may be disconnected from the back-up accumulator charging means and the port sealingly plugged. A thermal relief valve 60 is sealingly engaged within a relief port 61 defined through the lower plate 49. This valve 60 permits automatic pressure relief down to normal control level in the event that the actuator A is exposed to increased temperature environments to prevent overpressurization. Thus, as above described, the accumulator housing 3 and its associated parts define a chamber 48 within the actuator A, this chamber being referred to as the "accumulator" for the actuator A.

The actuator A is affixed to a bonnet assembly B and, in turn, to a gate or other valve mechanism C by means of the threaded bolts B7 being inserted through the bores 36A of the bonnet attachment 36 and the T-slot 14 being engagably secured to the bonnet head B2 on the upper end of a longitudinally extending bonnet stem B1 carried within the housing base B4 of the bonnet assembly B. The threaded bolts B7 secure the bonnet attachment 36 to the outer housing B6 of the bonnet assembly B, with the housing B6 being secured by threads B5 to the housing base B4. The bonnet assembly B and, in turn, the actuator A, are secured to the uppermost end of the gate valve C by means of nut and bolt assembly B3 extending through the housing base B4 and through the uppermost end of the valve seat S of the gate valve C. A plurality of O-rings B9 in a seal assembly housing B10 are defined in grooveways B11 to prevent fluid communication between the base B4 and the housing B10. Similarly designed O-rings B12 are carried within grooveways B13 to prevent fluid communication between the housing B10 and the bonnet stem B1. The housing B6 is threadedly secured to the housing base B4. As seen in FIG. 5, the bonnet stem B1 has provided at the uppermost end thereof a recessed ringhead B2, the outer diameter of which is somewhat less than the inner diameter of the T-slot 14 on the actuator stem 1. The T-slot 14 is defined at one end by a U-shaped outwardly protruding shoulder $B2^1$ which is designed for slidable engagement of the end $14^1$ of the ring B2, when the ring B2 is transversely shifted through the T-slot 14, either during engagement of disengagement of the actuator shaft 1 to the bonnet stem B1. The usage of the T-slot permits the bonnet stem B1 to be transversely inserted within, but not completely through, the actuator shaft A1 such that disengagement and engagement thereof may be conducted transversely without requirement of longitudinal movement of the bonnet stem B1 and/or the actuator shaft 1. FIG. 6 is an alternative embodiment depicting the ring B2 on the actuator shaft 1 and the T-slot 14 defined on the bonnet stem B1.

The gate valve C basically is comprised of a valve seat S which has defined longitudinally therethrough the gate G carried by the bonnet stem B1. As shown in FIG. 1, the gate G is in its upper and opened position with wire line W extending therethrough and through the gate valve C.

OPERATION

To install the actuator A onto a valve body C, such as shown in the FIGS., the actuator shaft 1 should be stroked to the down position, as shown in FIG. 1, either manually or by control line pressure being applied through passageways 21A and 21B and within the chamber 8. Thereafter, the actuator A is lowered over the bonnet stem B1. When the ring B2 is in substantial alignment with the T-slot 14 and the shoulder B2$^1$ the actuator shaft 1 and the bonnet stem B1 are transversely moved such that the ring B2 slides through the T-slot 14 with the end 14$^1$ of the ring B2 sliding along the shoulder B2$^1$ of the T-slot 14 until further transverse movement is prevented and the bonnet stem B1 and the actuator shaft 1 are in substantial longitudinal alignment, as shown in FIG. 4. Thereafter, pressure acting within chamber 8 and on piston 4 is bled off to permit the housing 3 to move longitudinally downwardly with respect to the bonnet assembly B. Thereafter, the bolts B7 may be affixed through the bores 36A to secure the actuator A to the bonnet assembly B. Thereafter, the bolts B7 may be affixed to the gate valve C by means of bolt B3. Alternatively, the bonnet assembly B may first be affixed to the valve C, and, thereafter, the bonnet stem B1 and actuator shaft 1 affixed as above described.

To remove the actuator A from the gate valve C and the bonnet assembly B, pressure within the control line 23 is permitted to be bled off to permit closure of the gate with respect to the valve seat S. The uppermost end of the actuator shaft 1 will rise to the position as shown in FIG. 2. Thereafter, the bolts B7 within their respective bores 36A may be easily removed. Thereafter, pressure is applied through the control line 23 and passageways 21A and 21B to exert pressure within chamber 8 on piston 4. Because the actuator A has been disengaged from the bonnet assembly B at the bonnet attachment 36 which, in turn, is secured to the housing 3 of the actuator A, the housing 3 will be caused to shift longitudinally upwardly with respect to the actuator shaft 1 which still is affixed to the bonnet stem B1 of the bonnet assembly B. Thereafter, the bonnet stem B1 may be disengaged from the actuator shaft 1 by moving one of the shaft 1 and the stem B1 transversely to permit the stem B1 to become disengaged from the shaft 1 and out of the T-slot 14. The actuator A then is completely free of the bonnet assembly B and the valve C and can be removed for repair of the actuator A or the valve C.

When the actuator is affixed to the bonnet assembly B, in order to place the gate in the down or open position, the control line 23 is affixed within the supply port 22 of the cap 20 on the actuator A and is, in turn, placed in fluid communication with the control panel for transmission of hydraulic or other pressurized fluid therethrough to the actuator A. The fluid passes within control line 23 through the cap 20 within the passageway 21A and concurrently is transmitted through passageway 21B into the upper piston chamber 8 and, when pressure is increased with the line 23, resistance afforded by the compression in spring 25 is overcome by a slight but negligible pressure increase such that the ball 26 will be removed and sealingly disengaged from its seat 27, thus permitting fluid transmission through the check valve 24, and the passage 24B to the accumulator chamber 48. Concurrently with the filling of the accumulator chamber 48, the pressure within the chamber defined by dynamic T-seals 6 and 9 exerts a force upon the piston head 4 greater than the opposing force contained within the chamber 11 between the seals 6 and 7 such that the shaft 1 is urged downwardly because of chamber area differential until the gate G of the gate valve C is completely opened.

As fluid is permitted to build up within the upper piston chamber 8, fluid also is transmitted through the check valve 24 and is contained within the accumulator chamber 48. Additionally, since the accumulator chamber 48 always is in fluid communication with the lower chamber 11 by means of the boost port 34, pressure and fluid are always permitted to enter the lower chamber 11. Since the check valve 24 is one-way acting, that is, it permits fluid within passageway 21A to travel therethrough and into the accumulator chamber 48, but prevents fluid within the chamber 48 from passing out of the chamber 48 and into the passageway 21A, the accumulator chamber 48 is fluid tight, and lower longitudinal travel of the piston head 4 will permit contraction of the lower chamber 11 area, with fluid being transmitted out of the lower chamber 11 through the boost port 34 and within the accumulator chamber 48 whereby the fluid is compressed.

It should be noted that the O-rings in association with the accumulator chamber 48 prevent fluid leakage. Additionally, it also should be noted that valves 58 and 47A are closed.

When it is desired to close the gate G of the gate valve C, fluid within the control line 23 will be bled off. As a result, pressure within the upper piston chamber 8 and the passageway 21A will be reduced below the amount necessary to position the shaft 1 downwardly and maintain the gate G in open position. However, it should be emphasized that pressure within the accumulator chamber 48 is not reduced, bled off or lost inasmuch as the ball 26 is sealingly engaged on its seat 27 by the compressive force afforded by the spring 25 in the check valve 24. Thus, the pressure within the accumulator chamber 48 will be at least equal to the initial high pressure carried to the actuator A within the control line 23, the passageway 21A and the upper piston chamber 8. Upon reduction of pressure within the upper piston chamber 8, the pressure within chambers 11 and 48 acting on the piston head 4 will permit the shaft 1 to be urged longitudinally upwardly with a force determined by accumulator pressure and the area defined within chamber 11. Thus, pressure is permitted to be built up within the accumulator chamber 48 such that the venting of control pressure within the control line 23 will enable the compressive fluid force contained within the accumulator chamber 48 to act as a compressed "spring", thus urging the shaft 1 longitudinally upwardly with sufficient force that the wire line W carried through and within the valve seat S within a lubricator assembly (not shown) will be completely sheared.

In order to reactivate the actuator A after shearing of the wire line W, pressure within the control line 23 is increased and the procedure as above described is repeated.

The desired compressive force to be charged within the accumulator chamber 48 is preselectable, with parameters being dependent upon the volume of the accumulator; the area of the upper and lower piston chambers 8 and 11, the pressure within the control line 23, the compressive force exerted by the spring 25, and the compressibility of the selected hydraulic or pneumatic control fluid.

Even though the accumulator chamber 48 and the lower chamber 11 are initially filled, they can be continuously and incrementally recharged in the event that O-rings and/or valves leak. Thus, it can be clearly seen that the accumulator chamber 48 is a continuously charged one, assuring a fixed pressurized force for selectively acting upon the lower end of the piston head 4 and, in turn, urging the shaft 1 to an upward position to shear the wire W and close the gate.

As an alternative source of shifting the shaft 1 longitudinally upwardly, a nitrogen or other fluid source may be affixed to the line 57, with the valve 58 being manipulated to "open" position. Thus, the nitrogen may be charged into the chamber 48 and the lower chamber 11 for activation upon the lower end of the piston head 4 to urge the shaft 1 in an upwardly position to shift the gate to completely closed position while still assuring fail safe operation of the valve C.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is desired to be secured by Letters Patent is:

1. An actuator respondable to control fluid pressure for moving an operative means of a valve body between open and closed position comprising: a housing defining a cylindrical bore therethrough; a shaft carried in said housing and engagable with said operative means; piston means carried by one of said shaft and said housing and sealingly slidable along the other of said shaft and said housing and longitudinally movable within said cylindrical bore; and fluid chamber means companionly associated with said piston means yielding a differential force across said piston means upon variation of fluid control pressure within said actuator, said shaft being selectively shiftable longitudinally in a first direction to move said operative means to one of open and closed positions by a variation of fluid control pressure, said shaft being selectively shiftable longitudinally in a second direction to move said operative means to the other of said open and closed positions upon subsequent variation of fluid control pressure, one of said shaft and said operative means having slotted means thereon and exterior of said valve body for transverse receipt of a companion engagement means on the other of said operative means and said shaft and exterior of said valve body whereby said operative means and said shaft may be selectively placed in substantial longitudinal engagement and selectively disengaged without affecting pressure integrity of said valve body.

2. In an actuator respondable to control fluid pressure for moving an operative means of a valve body between open and closed position: a housing defining a cylindrical bore therethrough; a shaft carried in said housing; means defining first and second effective piston areas carried by one of said shaft and said housing and sealingly slidable along the other of said shaft and said housing and longitudinally movable within said cylindrical bore; first and second fluid chambers companionly associated with said means defining said first and second effective piston areas within said bore yielding a differential force across said means defining said first and second effective piston areas upon increase of fluid control pressure within said actuator; continuously chargeable fluid accumulator means in fluid communication with said second fluid chamber for storage of energy defined by fluid compressible therein; fluid passage means for transmitting fluid under pressure to said first fluid chamber and to said accumulator means; valve means movable between open and closed positions and communicating between said accumulator means and said fluid passage means to permit fluid control pressure charging of said accumulator chamber when in said open position and preventing discharge of fluid pressure within said accumulator chamber when in said closed position, said valve means being responsive to pressure differential between said accumulator chamber and said fluid passage means, one of said housing and said shaft being engagable with said operative means, one of said housing and said shaft being selectively shiftable longitudinally in a first direction to move said operative means to one of open and closed positions by increase in fluid control pressure, one of said housing and said shaft means being selectively shiftable longitudinally in a second direction to move said operative means to the other of open and closed positions upon subsequent decrease in fluid control pressure and release of energy stored within said accumulator, one of said shaft and said housing having slotted means thereon and exterior of said valve body for transverse receipt of a companion engagement means on said operative means and exterior of said valve body, whereby said operative means and one of said shaft and said housing may be selectively placed in substantial longitudinal engagement and selectively disengaged without affecting pressure integrity of said valve body.

3. The apparatus of claim 2 wherein the continuously chargeable fluid accumulator means in fluid communication with said second fluid chamber is defined exteriorly of said housing and within said actuator.

4. The apparatus of claim 2 wherein the continuously chargeable fluid accumulator means in fluid communication with said second fluid chamber is exterior of said actuator.

5. The apparatus of claim 2 additionally comprising second fluid transmission means communicating to said continuously chargeable fluid accumulator means for storage of energy defined by second fluid carried within said transmission means and compressible in said accumulator means.

6. The apparatus of claim 2 wherein the fluid passage means transmits a liquid under pressure to said first chamber and to said accumulator means.

7. The apparatus of claim 2 wherein said fluid passage means transmits a gas under pressure to said first fluid chamber and to said accumulator means.

8. The apparatus of claim 2, said continuously chargeable fluid accumulator means receivable of at least one of liquid and gas fluid medium.

9. In an actuator respondable to control fluid pressure for moving an operative means of a valve body between open and closed position: a housing defining a cylindrical bore therethrough; a shaft carried in said housing and engagable with said operative means; means defining first and second effective piston areas carried by one of said shaft and said housing and sealingly slidable along the other of said shaft and said housing and longitudinally movable within said cylindrical bore; first and second fluid chambers companionly associated with said means defining said first and second effective piston areas within said bore yielding a differential force across said means defining said first and second effective piston areas upon increase of fluid control pressure within said actuator; continuously chargeable fluid accumulator means in fluid communication with said second fluid chamber for storage of energy defined by control fluid compressible therein; fluid passage means for transmitting fluid under pressure to said first fluid chamber and to said accumulator means; valve means movable between open and closed positions and communicating between said accumulator means and said fluid passage means to permit fluid control pressure charging of said accumulator chamber when in said open position and preventing discharge of fluid pressure within said accumulator chamber when in said closed position, said valve means being responsive to pressure differential between said accumulator chamber and said fluid passage means, said shaft being selectively shiftable longitudinally in a first direction to move said operative means to one of open and closed positions by increase in fluid control pressure, said shaft being selectively shiftable longitudinally in a second direction to move said operative means to the other of open and closed positions upon subsequent decrease in fluid control pressure and release of energy defined by control fluid compressed and stored within said accumulator, one of said shaft and said operative means having slotted means thereon and exterior of said valve body for transverse receipt of a companion engagement means on the other of said operative means and said shaft and exterior of said valve body, whereby said operative means and said shaft may be selectively placed in substantial longitudinal engagement and selectively disengaged without affecting pressure integrity of said valve body.

10. In an actuator respondable to control fluid pressure for moving an operative means of a valve body between open and closed position: a housing defining a cylindrical bore therethrough; a shaft carried in said housing and engagable with said operative means; means defining first and second effective piston areas carried by one of said shaft and said housing and sealingly slidable along the other of said shaft and said housing and longitudinally movable within said cylindrical bore; first and second fluid chambers companionly associated with said means defining said first and second effective piston areas within said bore; continuously chargeable fluid accumulator means in fluid communication with said second fluid chamber for storage of energy defined by fluid compressible therein; fluid passage means for transmitting fluid under pressure to said first fluid chamber and to said accumulator means; valve means movable between open and closed positions and communicating between said accumulator means and said fluid passage means to permit fluid control pressure charging of said accumulator chamber when in said open position and preventing discharge of fluid pressure within said accumulator chamber when in said closed position, said valve means being responsive to pressure differential between said accumulator chamber and said fluid passage means, said shaft being selectively shiftable longitudinally in a first direction to move said operative means to one of open and closed positions when pressure within said first and second fluid chambers is substantially equal, said shaft being selectively shiftable longitudinally in a second direction to move said operative means to the other of open and closed positions upon decrease of pressure within one of said first and second fluid chambers and release of energy stored within said accumulator, one of said shaft and said operative means having slotted means thereon and exterior of said valve body for transverse receipt of a companion engagement means on the other of said operative means and said shaft and exterior of said valve body, whereby said operative means and said shaft may be selectively placed in substantial longitudinal engagement and selectively disengaged without affecting pressure integrity of said valve body.

11. In an actuator respondable to control fluid pressure for moving an operative means on a valve body between open and closed position: a housing defining a cylindrical bore therethrough; a shaft carried in said housing and engagable with said operative means; means defining first and second effective piston areas carried by one of said shaft and said housing and sealingly slidable along the other of said shaft and said housing and longitudinally movable within said cylindrical bore; first and second fluid chambers companionly associated with said means defining said first and second effective piston areas within said bore yielding a differential force across said means defining said first and second effective piston areas upon increase of fluid control pressure within said actuator, said shaft being selectively shiftable longitudinally in a first direction to move said operative means to one of open and closed positions when pressure within said first and second fluid chambers is substantially equal, said shaft being selectively shiftable longitudinally in a second direction to move said operative means to the other of said open and closed positions when pressure defined by fluid within one of said first and second fluid chambers is greater than pressure defined by fluid within the other of said first and second fluid chambers, one of said shaft and said operative means having slotted means thereon and exterior of said valve body for transverse receipt of a companion engagement means on the other of said operative means and said shaft and exterior of said valve body, whereby said operative means and said shaft may be selectively placed in substantial longitudinal engagement and selectively disengaged without affecting pressure integrity of said valve body.

12. In an actuator respondable to control fluid pressure for moving an operative means of a valve body between open and closed position, said actuator comprising: a housing defining a cylindrical bore therethrough; a shaft carried in said housing and engagable with said operative means; piston means carried by one of said shaft and said housing and sealingly slidable along the other of said shaft and said housing and longitudinally movable within said cylindrical bore; fluid chamber means companionly associated with said piston means yielding a differential force across said piston means upon variation of fluid control pressure within said actuator, said shaft being selectively shiftable longitudinally in a first direction to move said operative means to one of open and closed positions by increase in fluid control pressure, said shaft being selectively shiftable longitudinally in a second direction to move said operative means to the other of said open and closed positions upon subsequent decrease in fluid control pressure, the improvement comprising: slotted means on one of said shaft and said operative means and exterior of said valve body for transverse receipt of a companion engagement means on the other of said operative means and said shaft and exterior of said valve body, whereby said operative means and said shaft may be selectively placed in substantial longitudinal engagement and selectively disengaged without affecting pressure integrity of said valve body.

13. In an actuator respondable to control fluid pressure for moving an operative means of a valve body between open and closed position, said actuator comprising: a housing defining a cylindrical bore therethrough; a shaft carried in said housing and engagable with said operative means; piston means carried by one of said shaft and said housing and sealingly slidable along the other of said shaft and said housing and longitudinally movable within said cylindrical bore; fluid chamber means companionly associated with said piston means yielding a differential force across said piston means upon variation of fluid control pressure with said actuator, said shaft being selectively shiftable longitudinally in a first direction to move said operative means to one of open and closed positions by increase in fluid control pressure, said shaft being selectively shiftable longitudinally in a second direction to move said operative means to the other of said open and closed positions upon subsequent decrease in fluid control pressure, the improvement comprising: slotted means on one of said shaft and said operative means and exterior of said valve body for transverse receipt of a companion engagement means on the other of said operative means and said shaft and exterior of said valve body, whereby said operative means and said shaft may be selectively placed in substantial longitudinal engagement and selectively disengaged without affecting pressure integrity of said valve body; and affixation means through said housing for engagement of said housing immediate said valve.

14. In an actuator resondable to control fluid pressure for moving an operative means of a valve body between open and closed position: a housing defining a cylindrical bore therethrough; a shaft carried in said housing and engagable with said operative means; means defining first and second effective piston areas carried by one of said shaft and said housing and sealingly slidable along the other of said shaft and said housing and longitudinally movable within said cylindrical bore; first and second fluid chambers companionly associated with said means defining said first and second effective piston areas within said bore yielding a differential force across said means defining first and second effective piston areas upon increase of fluid control pressure within said actuator; continuously chargeable fluid accumulator means in fluid communication with said second fluid chamber for storage of energy defined by fluid compressible therein; fluid passage means for transmitting fluid under pressure to said first fluid chamber and to said accumulator means; valve means movable between open and closed positions and communicating between said accumulator means and said fluid passage means to permit fluid control pressure charging of said accumulator chamber when in said open position and preventing discharge of fluid pressure within said accumulator chamber when in said closed position, said valve means being responsive to pressure differential between said accumulator chamber and said fluid passage means, said shaft being selectively shiftable longitudinally in a first direction to move said operative means to one of open and closed positions by increase in fluid control pressure, said shaft being selectively shiftable longitudinally in a second direction to move said operative means to the other of said open and closed positions upon subsequent decrease in fluid control pressure and release of energy stored within said accumulator; and slotted means on one of said shaft and said operative means and exterior of said valve body for transverse receipt of a companion engagement means on the other of said operative means and said shaft and exterior of said valve body, whereby said operative means and said shaft may be selectively placed in substantial longitudinal engagement and selectively disengaged without affecting pressure integrity of said valve body.

15. An actuator respondable to control fluid pressure for moving an operative means of a valve body between open and closed position comprising: a housing defining a cylindrical bore therethrough; a shaft carried in said housing and engagable with said operative means; piston means carried by at least one of said shaft and said housing and sealingly slidable along one of said shaft and said housing and longitudinally movable within said cylindrical bore; and fluid chamber means companionly associated with said piston means yielding a differential force across said piston means upon variation of fluid control pressure within said actuator, said shaft being selectively shiftable longitudinally in a first direction to move said operative means to one of open and closed positions by increase in fluid control pressure, said shaft being selectively shiftable longitudinally in a second direction to move said operative means to the other of said open and closed positions upon subsequent decrease in fluid control pressure, one of said shaft and said operative means having slotted means thereon and exterior of said valve body for transverse receipt of a companion engagement means on the other of said operative means and said shaft and exterior of said valve body, whereby said operative means and said shaft may be selectively placed in substantial longitudinal engagement and selectively disengaged without affecting pressure integrity of said valve body.

16. In an actuator respondable to control fluid pressure for moving an operative means of a valve body between open and closed position: a housing defining a cylindrical bore therethrough; a shaft carried in said housing; means defining first and second effective piston areas carrid by at least one of said shaft and said housing and sealingly slidable along one of said shaft and said housing and longitudinally movable within said cylindrical bore; first and second fluid chambers companionly associated with said means defining said first and second effective piston areas within said bore yielding a differential force across said means defining said first and second effective piston areas upon increase of fluid control pressure within said actuator; continuously chargeable fluid accumulator means in fluid communication with said second fluid chamber for storage of energy defined by fluid compressible therein; fluid passage means for transmitting fluid under pressure to said first fluid chamber and to said accumulator means; valve means movable between open and closed positions and communicating between said accumulator means and said fluid passage means to permit fluid control pressure charging of said accumulator chamber when in one of said open and closed positions and preventing discharge of fluid pressure within said accumulator chamber when in the other of said open and closed positions, said valve means being responsive to pressure differential between said accumulator chamber and said fluid passage means, one of said housing and said shaft being engagable with said operative means, one of said housing and said shaft being selectively shiftable longitudinally in a first direction to move said operative means to one of open and closed positions by increase in fluid control pressure, one of said housing and said shaft means being selectively shiftable longitudinally in a second direction to move said operative means to the other of open and closed positions upon subsequent decrease in fluid control pressure and release of energy stored within said accumulator, one of said shaft and said housing having slotted means thereon and exterior of said valve body for transverse receipt of a companion engagement means on said operative means and exterior of said valve body, whereby said operative means and one of said shaft and said housing may be selectively placed in substantial longitudinal engagement and selectively disengaged without affecting pressure integrity of said valve body.

17. The apparatus of claim 16 wherein the continuously chargeable fluid accumulator means in fluid communication with said second fluid chamber is defined exteriorly of said housing and within said actuator.

18. The apparatus of claim 16 wherein the continuously chargeable fluid accumulator means in fluid communication with said second fluid chamber is exterior of said actuator.

19. The apparatus of claim 16 additionally comprising second fluid transmission means communicating to said continuously chargeable fluid accumulator means for storage of energy defined by second fluid carried within said transmission means and compressible in said accumulator means.

20. The apparatus of claim 16 wherein the fluid passage means transmits a liquid under pressure to said first chamber and to said accumulator means.

21. The apparatus of claim 16 wherein said fluid passage means transmits a gas under pressure to said first fluid chamber and to said accumulator means.

22. The apparatus of claim 16, said continuously chargeable fluid accumulator means receivable of at least one of liquid and gas fluid medium.

23. In an actuator respondable to control fluid pressure for moving an operative means of a valve body between open and closed position: a housing defining a cylindrical bore therethrough; a shaft carried in said housing and engagable with said operative means; means defining first and second effective piston areas carried by at least one of said shaft and said housing and sealing slidable along one of said shaft and said housing and longitudinally movable within said cylindrical bore; first and second fluid chambers companionly associated with said means defining said first and second effective piston areas within said bore yielding a differential force across said means defining said first and second effective piston areas upon increase of fluid control pressure within said actuator; continuously chargeable fluid accumulator means in fluid communication with said second fluid chamber for storage of energy defined by control fluid compressible therein; fluid passage means for transmitting fluid under pressure to said first fluid chamber and to said accumulator means; valve means movable between open and closed positions and communicating between said accumulator means and said fluid passage means to permit fluid control pressure charging of said accumulator chamber when in one of said open and closed positions and preventing discharge of fluid pressure within said accumulator chamber when in the other of said open and closed positions, said valve means being responsive to pressure differential between said accumulator chamber and said fluid passage means, said shaft being selectively shiftable longitudinally in a first direction to move said operative means to one of open and closed positions by increase in fluid control pressure, said shaft being selectively shiftable longitudinally in a second direction to move said operative means to the other of open and closed positions upon subsequent decrease in fluid control pressure and release of energy defined by control fluid compressed and stored within said accumulator, one of said shaft and said operative means having slotted means thereon and exterior of said valve body for transverse receipt of a companion engagement means on the other of said operative means and said shaft and exterior of said valve body, whereby said operative means and said shaft may be selectively placed in substantial longitudinal engagement and selectively disengaged without affecting pressure integrity of said valve body.

24. In an actuator respondable to control fluid pressure for moving an operative means of a valve body between open and closed position: a housing defining a cylindrical bore therethrough; a shaft carried in said housing and engagable with said operative means; means defining first and second effective piston areas carried by at least one of said shaft and said housing and sealingly slidable along one of said shaft and said housing and longitudinally movable within said cylindrical bore; first and second fluid chambers companionly associated with said means defining said first and second effective piston areas within said bore; continuously chargeable fluid accumulator means in fluid communication with said second fluid chamber for storage of energy defined by fluid compressible therein; fluid passage means for transmitting fluid under pressure to said first fluid chamber and to said accumulator means; valve means movable between open and closed positions and communication between said accumulator means and said fluid passage means to permit fluid control pressure charging of said accumulator chamber when in one of said open and closed positions and preventing discharge of fluid pressure within said accumulator chamber when in the other of said open and closed positions, said valve means being responsive to pressure differential between said accumulator chamber and said fluid passage means, said shaft being selectively shiftable longitudinally in a first direction to move said operative means to one of open and closed positions when pressure within said first and second fluid chambers is substantially equal, said shaft being selectively shiftable longitudinally in a second direction to move said operative means to the other of open and closed positions upon decrease of pressure within one of said first and second fluid chambers and release of energy stored within said accumulator, one of said shaft and said operative means having slotted means thereon and exterior of said valve body for transverse receipt of a companion engagement means on the other of said operative means and said shaft and exterior of said valve body, whereby said operative means and said shaft may be selectively placed in substantial longitudinal engagement and selectively disengaged without affecting pressure integrity of said valve body.

25. In an actuator respondable to control fluid pressure for moving an operative means of a valve body between open and closed position; a housing defining a cylindrical bore therethrough; a shaft carried in said housing and engagable with said operative means; means defining first and second effective piston areas carried by at least one of said shaft and said housing and sealingly slidable along one of said shaft and said housing and longitudinally movable within said cylindrical bore; first and second fluid chambers companionly associated with said means defining said first and second effective piston areas within said bore yielding a differential force across said means defining said first and second effective piston areas upon increase of fluid control pressure within said actuator, said shaft being selectively shiftable longitudinally in a first direction to move said operative means to one of open and closed positions when pressure within said first and second fluid chambers is substantially equal, said shaft being selectively shiftable longitudinally in a second direction to move said operative means to the other of said open and closed positions when pressure defined by fluid within one of said first and second fluid chambers is greater than pressure defined by fluid within the other of said first and second fluid chambers, one of said shaft and said operative means having slotted means thereon and exterior of said valve body for transverse receipt of a companion engagement means on the other of said operative means and said shaft and exterior of said valve body, whereby said operative means and said shaft may be selectively placed in substantial longitudinal engagement and selectively disengaged without affecting pressure integrity of said valve body.

26. In an actuator respondable to control fluid pressure for moving an operative means of a valve body between open and closed position, said actuator comprising: a housing defining a cylindrical bore therethrough; a shaft carried in said housing and engagable with said operative means; piston means carried by at least one of said shaft and said housing and sealingly slidable along one of said shaft and said housing and longitudinally movable within said cylindrical bore; fluid chamber means companionly associated with said piston means yielding a differential force across said piston means upon variation of fluid control pressure within said actuator, said shaft being selectively shiftable longitudinally in a first direction to move said operative means to one of open and closed positions by increase in fluid control pressure, said shaft being selectively shiftable longitudinally in a second direction to move said operative means to the other of said open and closed positions upon subsequent decrease in fluid control pressure, the improvement comprising: slotted means on one of said shaft and said operative means and exterior of said valve body for transverse receipt of a companion engagement means on the other of said operative means and said shaft and exterior of said valve body, whereby said operative means and said shaft may be selectively placed in substantial longitudinal engagement and selectively disengaged without affecting pressure integrity of said valve body.

27. In an actuator respondable to control fluid pressure for moving an operative means of a valve body between open and closed position, said actuator comprising: a housing defining a cylindrical bore therethrough; a shaft carried in said housing and engagable with said operative means; piston means carried by at least one of said shaft and said housing and sealingly slidable along one of said shaft and said housing and longitudinally movable within said cylindrical bore; fluid chamber means companionly associated with said piston means yielding a differential force across said piston means upon variation of fluid control pressure within said actuator, said shaft being selectively shiftable longitudinally in a first direction to move said operative means to one of open and closed positions by increase in fluid control pressure, said shaft being selectively shiftable longitudinally in a second direction to move said operative means to the other of said open and closed positions upon subsequent decrease in fluid control pressure, the improvement comprising: slotted means on one of said shaft and sand operative means and exterior of said valve body for transverse receipt of a companion engagement means on the other of said operative means and said shaft and exterior of said valve body, whereby said operative means and said shaft may be selectively placed in substantial longitudinal engagement and selectively disengaged without affecting pressure integrity of said valve body; and affixation means through said housing for engagement of said housing immediate said valve.

28. In an actuator respondable to control fluid pressure for moving an operative means of a valve body between open and closed position; a housing defining a cylindrical bore therethrough; a shaft carried in said housing and engagable with said operative means; means defining first and second effective piston areas carried by at least one of said shaft and said housing and sealingly slidable along one of said shaft and said housing and longitudinally movable within said cylindrical bore; first and second fluid chambers companionly associated with said means defining said first and second effective piston areas within said bore yielding a differential force across said means defining first and second effective pistion areas upon increase of fluid control pressure within said actuator; continuously chargeable fluid accumulator means in fluid communication with said second fluid chamber for storage of energy defined by fluid compressible therein; fluid passge means for transmitting fluid under pressure to said first fluid chamber and to said accumulator means; valve means movable between open and closed positions and communicating between said accumulator means and said fluid passage means to permit fluid control pressure charging of said accumulator chamber when in one of said open and closed positions and preventing discharge of fluid pressure within said accumulator chamber when in the other of said open and closed positions. said valve means being responsive to pressure differential between said accumulator chamber and said fluid passge means, said shaft being selectively shiftable longitudinally in a first direction to move said operative means to one of open and closed positions by increase in fluid control pressure, said shaft being selectively shiftable longitudinally in a second direction to move said operative means to the other of said open and closed positions upon subsequent decrease in fluid control pressure and release of energy stored within said accumulator; and slotted means on one of said shaft and said operative means and exterior of said valve body for transverse receipt of a companion engagement means on the other of said operative means and said shaft and exterior of said valve body, whereby said operative means and said shaft may be selectively placed in substantial longitudinal engagement and selectively disengaged without affecting pressure integrity of said valve body.

* * * * *